F. FELLHAUER.
COUPLING FOR WHIFFLETREES.
APPLICATION FILED JAN. 5, 1910.
966,437.
Patented Aug. 9, 1910.
2 SHEETS—SHEET 1.
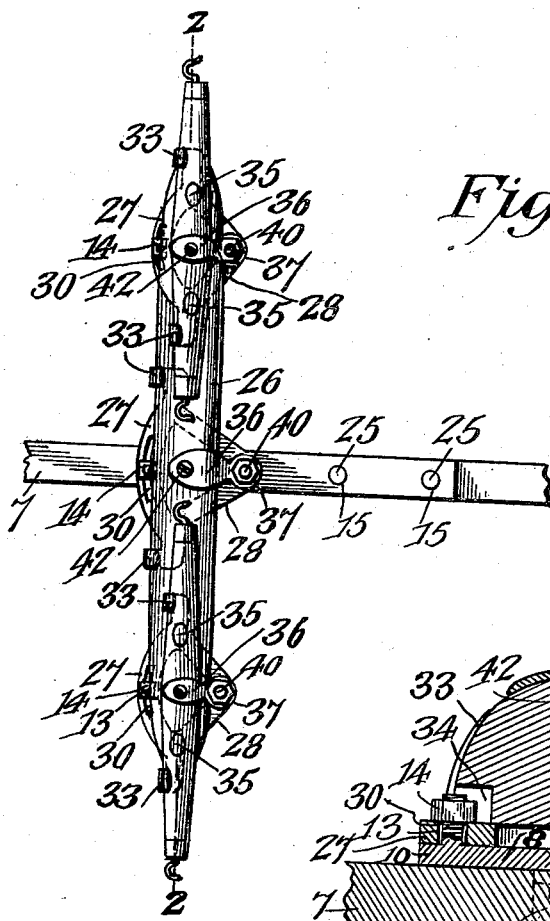
Fig. 1.
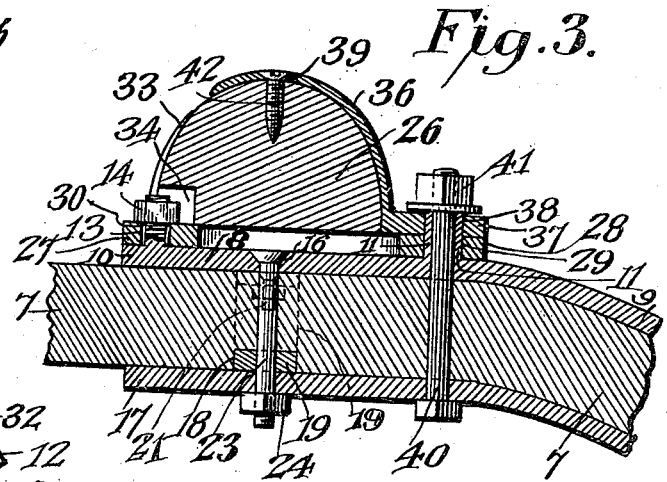
Fig. 3.
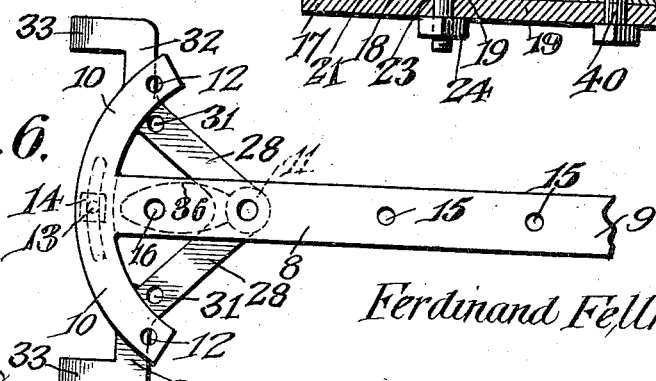
Fig. 6.
Witnesses
Ferdinand Fellhauer,
Inventor
By
Attorney F. FELLHAUER.
COUPLING FOR WHIFFLETREES.
APPLICATION FILED JAN. 5, 1910.
966,437.
Patented Aug. 9, 1910.
2 SHEETS—SHEET 2.
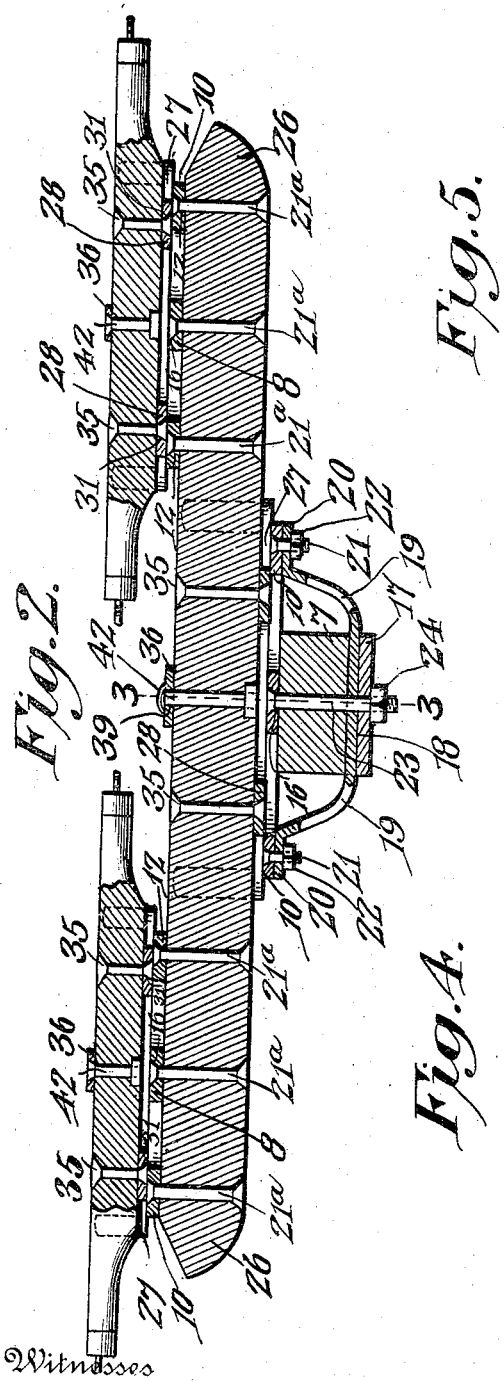
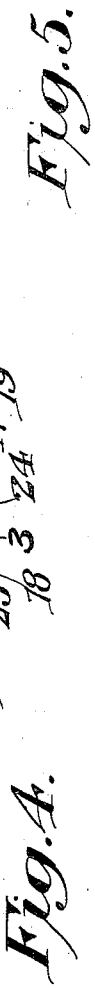
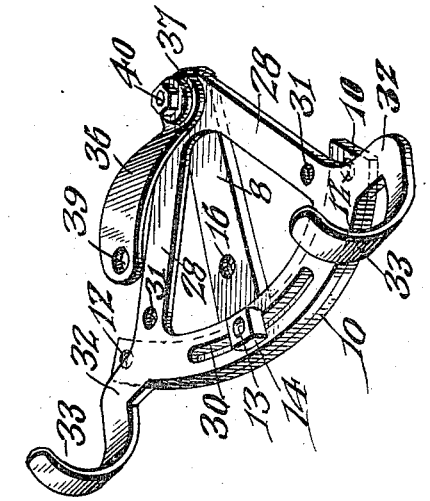
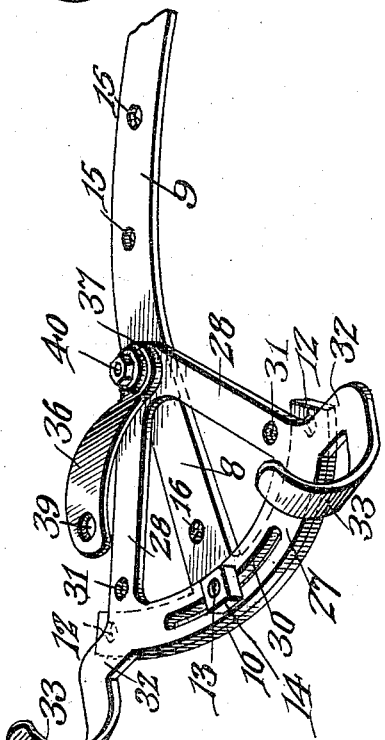
Ferdinand Fellhauer,
Inventor
Witnesses
By
Attorney

UNITED STATES PATENT OFFICE.

FERDINAND FELLHAUER, OF OSBORN, MISSOURI.

COUPLING FOR WHIFFLETREES.

966,437.  Specification of Letters Patent.  Patented Aug. 9, 1910.

Application filed January 5, 1910. Serial No. 536,592.

*To all whom it may concern:*

Be it known that I, FERDINAND FELLHAUER, a citizen of the United States, residing at Osborn, in the county of Dekalb and State of Missouri, have invented a new and useful Coupling for Whiffletrees, of which the following is a specification.

This invention relates to an improvement in couplings for whiffletrees.

The couplings now in general use permit a considerable vertical movement to the trees, and also permit of a practically unlimited horizontal movement thereof. The vertical movement of the trees causes considerable strain to be imparted to the coupling pivots, and the horizontal movement shortens the life of the swingle-trees, by their contact with the vehicle wheels. Furthermore, both the swingle and double-trees now generally employed, are provided with pivots respectively extending through the center of each member, which weaken the trees to such an extent that they easily become broken.

The principal object of this invention is to provide couplings for both the swingle and double-trees which will obviate the vertical movement, limit the horizontal movement, and provide a pivot arranged in rear of the trees whereby the pull on the trees will be from the rear and not from the center, and will therefore give to the trees a longer life than those now in general use.

Another object of the invention is to provide a whiffletree of the character described which will dispense with the usual holdback straps.

A still further object of the invention is to provide an extremely simple coupling which is positive in operation, and cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size, and minor details of construction, within the scope of the claims, may be resorted to without departing from the spirit or sacrificing any of the advantages of the invention.

In the drawings:—Figure 1 is a top plan view of a whiffletree embodying my invention. Fig. 2 is an enlarged longitudinal sectional view taken on the line 2—2 of Fig. 1. Fig. 3 is an enlarged cross sectional view taken on the line 3—3 of Fig. 2. Fig. 4 is a perspective view of the coupling for double-trees. Fig. 5 is a perspective view of the coupling for swingle-trees, and Fig. 6 is a bottom plan view of the double-tree coupling shown in Fig. 4.

Like reference numerals designate corresponding parts in all the figures of the drawings.

Referring to the drawings, 7 designates a pole of a vehicle, on the upper surface of which is arranged a bearing plate 8 having its rear end 9 curved to conform to the shape of the pole. The front end of the said plate is provided with oppositely extending integral curved arms 10—10 which are concentric with a boss 11 which is integral with and upstanding from the said plate. These arms 10 increase the area of the bearing plate, and are each provided with an opening 12 near its end. Intermediate of the two arms, is an upstanding threaded stud 13 having a nut 14 associated therewith. The bearing plate 8 is furthermore provided in rear of the opening 11 with a plurality of openings 15—15, and intermediate of the said openings 11 and the stud 13 is an opening 16. A reinforcing plate 17 of metal is arranged on the underside of the pole directly below the bearing plate 8. A transverse slot 18 is formed on the underside of the pole directly above the said plate 17 for receiving a brace 19. The brace 19 is substantially U-shaped and has its ends 20—20 bent to engage the underside of the ends of the arms 10—10. The said ends 20—20 of the brace are secured to the said arms by means of bolts 21—21 and nuts 22—22 or other suitable fastening means. A bolt 23 is passed through the opening 16 of the bearing plate 8, through the pole 7, brace 19, and the reinforcing plate 17, and retains the said elements in their associated relation by a nut 24. The bearing plate 8 and the reinforcing plate 17, are furthermore securely retained in position by bolts 25—25 seated in the openings 15—15.

The invention further comprises a sector-shaped frame for supporting a double-tree 26. This frame is arranged upon the bearing plate 8 and comprises an arcuate front arm 27 corresponding in shape to the arms 10—10 of the said plate 8, and rearwardly converging side arms 28—28 which are united at their ends. An opening 29 is formed at the juncture of the said arms, and the arcuate front arm 27 is concentric therewith. An arcuate slot 30 is centrally formed in the said front arm, and openings 31—31 are respectively formed in the side arms. Opposite lateral projections 32—32 extend from the ends of the said front arm, and respectively terminate in forwardly and upwardly extending curved fingers 33—33. The double-tree 26 is provided on its front edge with a cut-out portion 34. The said tree is positioned upon the frame, and the fingers 33—33 engage the tree at either side of the center thereof. The tree is secured to the frame by rivets 35 arranged in the openings 31—31 of the side arms 28—28.

The invention further comprises a clip or brace 36 which is curved to conform to the shape of the tree and is provided at its lower end with a foot-piece 37 having an opening 38 formed therein, and near its upper end with an opening 39. The double-tree and plate are positioned upon the bearing plate 8, the stud 13 of the said plate projecting through the slot 30 of the frame and secured thereon by the nut 14, the said nut being arranged within the cut-out portion 34 of the double-tree. The opening 29 of the frame is positioned around the boss 11, and the foot-piece is positioned upon the frame, the opening 38 therein being also arranged around the said boss 11. The boss extends a trifle above the foot-piece, and a bolt 40 is passed through the pole from the underside thereof, and thence through and beyond the said boss 11. A nut 41 is threaded onto the end of the bolt, and bears against the boss 11. Thus, it will be observed that the boss forms a vertical pivot to permit of the double-tree swinging horizontally. Furthermore, by reason of the fact that the boss extends beyond the foot-piece, the double-tree is permitted to move with freedom, because the nut bears upon the boss and not upon the said movable parts. The clip 36, which is arranged to engage the rear face of the double-tree, is positively secured to the said tree by means of a screw 42.

From the foregoing, it will be readily seen that on account of the large bearing surface of the plate 8, the double-tree will be prevented from any vertical movement, and because of the stud 13 being arranged with the slot 30, only a limited horizontal movement of the tree will be permitted, thereby preventing any possible contact between the same and the wheels of the vehicle, and also avoiding the use of the hold-back straps as is now in common use. It will furthermore be observed that the fingers 33—33, being arranged on each side of the center of the tree, will serve as an abutment for the same. The pivot 11 being arranged in rear of the tree, causes the pull to be placed thereon, thus eliminating any danger of the double-tree becoming easily broken. It will furthermore be observed that this coupling can be employed equally as well for swingle-trees, as illustrated in the drawings, and particularly in Fig. 5 thereof; the only difference being that the curved end 9 of the base plate 8 and the brace 19 are eliminated. In attaching the swingle-tree couplings to a double-tree, the bearing plate is preferably secured thereon by means of rivets 21$^a$, instead of bolts.

Inasmuch as the constructions are identical, with the above exceptions, the same reference numerals will suffice to point out the different parts, and a detailed description seems unnecessary.

What I claim is:—

1. A coupling of the class described comprising a bearing plate having oppositely-extending lateral curved arms at its front end, a tree-holding frame pivotally mounted on the bearing plate to swing horizontally upon the same, forwardly and upwardly curved tree-engaging fingers extending from the front edge of the frame and at each end thereof, a tree-holding clip pivotally mounted on the frame at the rear, means for rigidly connecting the clip to the tree, and means carried by the plate at the front and engaging the frame for limiting the said horizontal movement of the frame, said means being arranged between the ends of the plate and frame and terminating short of the tree-engaging fingers.

2. A coupling of the class described comprising a bearing plate having oppositely-extending laterally curved arms at its front end, an integral boss extending upwardly from the plate in rear of said arms, a tree-holding frame pivotally mounted on the boss to swing horizontally over the plate, means connecting the plate and the frame at the front to limit the horizontal movement of the frame, and a curved clip mounted at its base upon the said boss and connected at its top to the tree and extending partially around the latter from the rear.

3. A coupling of the class described comprising a bearing plate having oppositely-extending curved arms at its front end, an upstanding stud carried by the plate and arranged intermediate of the arms, a tree-holding sector-shaped frame pivotally mounted on the bearing plate to swing horizontally over the same and the projections, the front arm of the frame being curved to conform to the shape of the opposite arms of the bearing plate, and provided with an arcuate slot which co-acts with the upstanding stud of the said plate to limit the horizontal movement of the frame, opposite lateral projections extending from the ends of the front arm and respectively terminating in forwardly and upwardly curved tree-engaging fingers, and a tree retaining clip carried by the frame and arranged to swing therewith, said clip being connected to the tree.

4. A coupling of the class described comprising a bearing plate having oppositely-extending curved arms integral with and arranged at the front end thereof, a tree-holding sector-shaped frame mounted on the bearing plate, said frame comprising an arcuate front arm which engages the curved arms of the bearing plate opposite lateral projections extending from the ends of the front arm and respectively terminating in forwardly and upwardly extending tree-engaging fingers and rearwardly converging side arms which are united at their juncture, the frame at the said juncture being provided with a boss adapted to receive and permit the frame to swing horizontally, and means co-acting with the bearing plate and the frame for limiting the horizontal movement of the latter.

5. A coupling of the class described comprising a bearing plate having an opening formed therein, oppositely-extending curved arms integral with and arranged at the front end thereof and concentric with the said opening, an upstanding stud carried by the plate and arranged intermediate of the arms, a tree-holding sector-shaped frame mounted on the bearing plate, said frame comprising an arcuate front arm which engages the curved arms of the bearing plate and rearwardly converging side arms which are united at their juncture, the said front arm of the frame being centrally and longitudinally provided with an arcuate slot for receiving the upstanding stud of the bearing plate, and the juncture of the side arms being provided with a boss which is adapted to receive the opening of the said bearing plate, a tree-retaining clip mounted on the frame and provided with an opening which also surrounds the boss of the plate, means for connecting the clip to the tree, opposite projections respectively extending from each end of the front arm of the frame and terminating in forwardly and upwardly extending curved fingers which engage the front sides of the tree on either side of the center thereof, a bolt arranged within the said boss and extending beyond the same, and a nut secured on the end of the bolt for holding the movable parts in position and permitting a free horizontal swinging movement thereof, the upstanding stud of the plate and the arcuate slot of the frame co-acting to limit the said horizontal movement of the frame and clip.

6. A coupling of the class described comprising a bearing plate having oppositely-extending laterally curved arms at its front end, an integral boss extending upwardly from the plate in rear of said arms, a tree-holding frame pivotally mounted upon the boss to swing horizontally over the plate, means connecting the plate and frame at the front to limit the horizontal movement of the frame, integral tree-holding fingers carried by the ends of the frame beyond the said limiting means and serving to rigidly attach the tree to the frame at the front, and a curved clip mounted at its base upon the said boss and connected at its top to the tree and extending partially around the latter from the rear.

In testimony, that I claim the foregoing as my own, I have hereto affixed my signature in the presence of two witnesses.

FERDINAND FELLHAUER.

Witnesses:
J. F. MONTGOMERY,
F. M. WICKS.